US007583982B2

(12) United States Patent
Olesen et al.

(10) Patent No.: US 7,583,982 B2
(45) Date of Patent: Sep. 1, 2009

(54) METHOD AND APPARATUS TO IMPROVE CHANNEL QUALITY FOR USE IN WIRELESS COMMUNICATIONS SYSTEMS WITH MULTIPLE-INPUT MULTIPLE-OUTPUT (MIMO) ANTENNAS

(75) Inventors: Robert Lind Olesen, Huntington, NY (US); Jaeyoung Kwak, Morganville, NJ (US); Aykut Bultan, Bayside, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 590 days.

(21) Appl. No.: 11/167,736

(22) Filed: Jun. 27, 2005

(65) Prior Publication Data

US 2006/0030364 A1 Feb. 9, 2006

Related U.S. Application Data

(60) Provisional application No. 60/599,542, filed on Aug. 6, 2004.

(51) Int. Cl.
*H04M 1/00* (2006.01)
(52) U.S. Cl. .................... 455/562.1; 455/500; 455/517; 375/267; 375/146
(58) Field of Classification Search ................ 455/101, 455/103, 500, 517, 562.1, 69, 506, 65, 132, 455/133, 67.11, 272, 450, 126, 277.1, 21, 455/24, 63.1, 66.1; 375/267, 299, 146, 152
See application file for complete search history.

(56) References Cited

U.S. PATENT DOCUMENTS

| | | | |
|---|---|---|---|
| 5,614,914 A | 3/1997 | Bolgiano et al. | |
| 7,069,053 B2* | 6/2006 | Johannisson et al. | ..... 455/562.1 |
| 7,099,698 B2* | 8/2006 | Tarokh et al. | ............ 455/562.1 |
| 7,236,748 B2* | 6/2007 | Li et al. | ......................... 455/69 |
| 7,242,724 B2* | 7/2007 | Alexiou et al. | .............. 375/267 |
| 7,280,604 B2* | 10/2007 | Giannakis et al. | ........... 375/260 |
| 7,289,585 B2* | 10/2007 | Sandhu et al. | .............. 375/347 |
| 7,327,983 B2* | 2/2008 | Mehta et al. | ............... 455/63.1 |
| 7,411,929 B2* | 8/2008 | Ling et al. | .................. 370/334 |
| 2004/0209579 A1* | 10/2004 | Vaidyanathan | .............. 455/101 |
| 2005/0101259 A1* | 5/2005 | Tong et al. | ..................... 455/69 |
| 2005/0286663 A1* | 12/2005 | Poon | .......................... 375/347 |
| 2006/0030364 A1* | 2/2006 | Olesen et al. | ............ 455/562.1 |
| 2007/0183523 A1* | 8/2007 | Koo et al. | .................... 375/261 |
| 2007/0206504 A1* | 9/2007 | Koo et al. | .................... 370/245 |

OTHER PUBLICATIONS

Telatar, "Capacity of Multi-antenna Gaussian Channels", Euro. Trans. Telecommun., vol. 10, No. 6, Nov. 1999, pp. 1-28.

(Continued)

*Primary Examiner*—Edward Urban
*Assistant Examiner*—Christian A Hannon
(74) *Attorney, Agent, or Firm*—Volpe and Koenig P.C.

(57) ABSTRACT

A technique which improves SINR in a communication system utilizing MIMO antennas is described. Transmitter and receiver components use fixed transmit and receive beamforming matrices and variable transmit and receive beamforming vectors. A method of channel conditioning using an iterative closed loop process is also described.

15 Claims, 6 Drawing Sheets

OTHER PUBLICATIONS

Foschini et al., "On Limits of Wireless Communications in a Fading Environment when Using Multiple Antennas", Wireless Personal Communications, vol. 6, No. 3, 1988, pp. 311-335.

Berenguer et al., "Coding and Signal Processing for MIMO Communications—A Primer", pp. 1-25.

Pascual-Iserte et al., "On Power Allocation Strategies for Maximum Signal to Noise and Interference Ratio in an OFDM-MIMO System", IEEE Transactions on Wireless Communications, vol. 3, No. 3, May 2004, pp. 808-820.

Wachsmann et al., "Exploiting the Data-Rate Potential for MIMO Channels: Multi-Stratum Space-Time Coding", Ericsson Eurolab Deutchland GmbH, Nordostpark 12, D-90411 Nurnberg, Germany.

Maa et al., "Structures of Space-Time Codes and Multipath MIMO Channels", IEEE Signal Processing Letters, vol. 11, No. 4, Apr. 2004, pp. 439-442.

Schumacher et al., "From Antenna Spacings to Theoretical Capacities—Guidelines for Simulating MIMO Systems", IEEE PIMRC, 2002, pp. 587-592.

Jongren et al., "Combining Beamforming and Orthogonal Space-time Block Coding", IEEE Transactions on Information Theory, pp. 611-627.

Wong et al., "Adaptive Antennas at the Mobile and Base Stations in an OFDM/TDMA System", IEEE Transactions on Communications, vol. 49, No. 1, Jan. 2001, pp. 195-206.

* cited by examiner

METHOD AND APPARATUS TO IMPROVE CHANNEL QUALITY FOR USE IN WIRELESS COMMUNICATIONS SYSTEMS WITH MULTIPLE-INPUT MULTIPLE-OUTPUT (MIMO) ANTENNAS

CROSS REFERENCE TO RELATED APPLICATION(S)

The present application claims the benefit of U.S. Provisional Patent Application No. 60/599,542, filed Aug. 6, 2004, which is incorporated by reference as if fully set forth.

FIELD OF INVENTION

The present invention relates to wireless communication systems with Multiple-Input Multiple-Output (MIMO) antennas. Specifically, the invention relates to conditioning the spatial channel by using beamforming techniques.

BACKGROUND

Wireless communication systems are well known in the art. Generally, such systems comprise communication stations, which transmit and receive wireless communication signals between each other. Depending upon the type of system, communication stations typically are one of two types of wireless units: one type is the base station (BS), and the other is the wireless transmit/receive unit (WTRU), which may be mobile.

The term base station (BS) as used herein includes, but is not limited to, a base station, access point, Node B, site controller, or other interfacing device in a wireless environment that provides WTRUs with wireless access to a network with which the access point is associated.

The term wireless transmit/receive unit (WTRU) as used herein includes, but is not limited to, a user equipment, mobile station, fixed or mobile subscriber unit, pager, or any other type of device capable of operating in a wireless environment. Such WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided wherein each base station is capable of conducting concurrent wireless communications with appropriately configured WTRUs, as well as multiple appropriately configured base stations. Some WTRUs may alternatively be configured to conduct wireless communications directly between each other, i.e., without being relayed through a network via a base station. This is commonly called peer-to-peer wireless communications. Where a WTRU is configured to communicate directly with other WTRUs it may itself also be configured as and function as a base station. WTRUs can be configured for use in multiple networks, with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems.

Popular WLAN environments with one or more WLAN base stations, typically called access points (APs), are built according to the IEEE 802 family of standards. Access to these networks usually requires user authentication procedures. Protocols for such systems are presently being standardized in the WLAN technology area such as the framework of protocols provided in the IEEE 802 family of standards.

Figure 1:
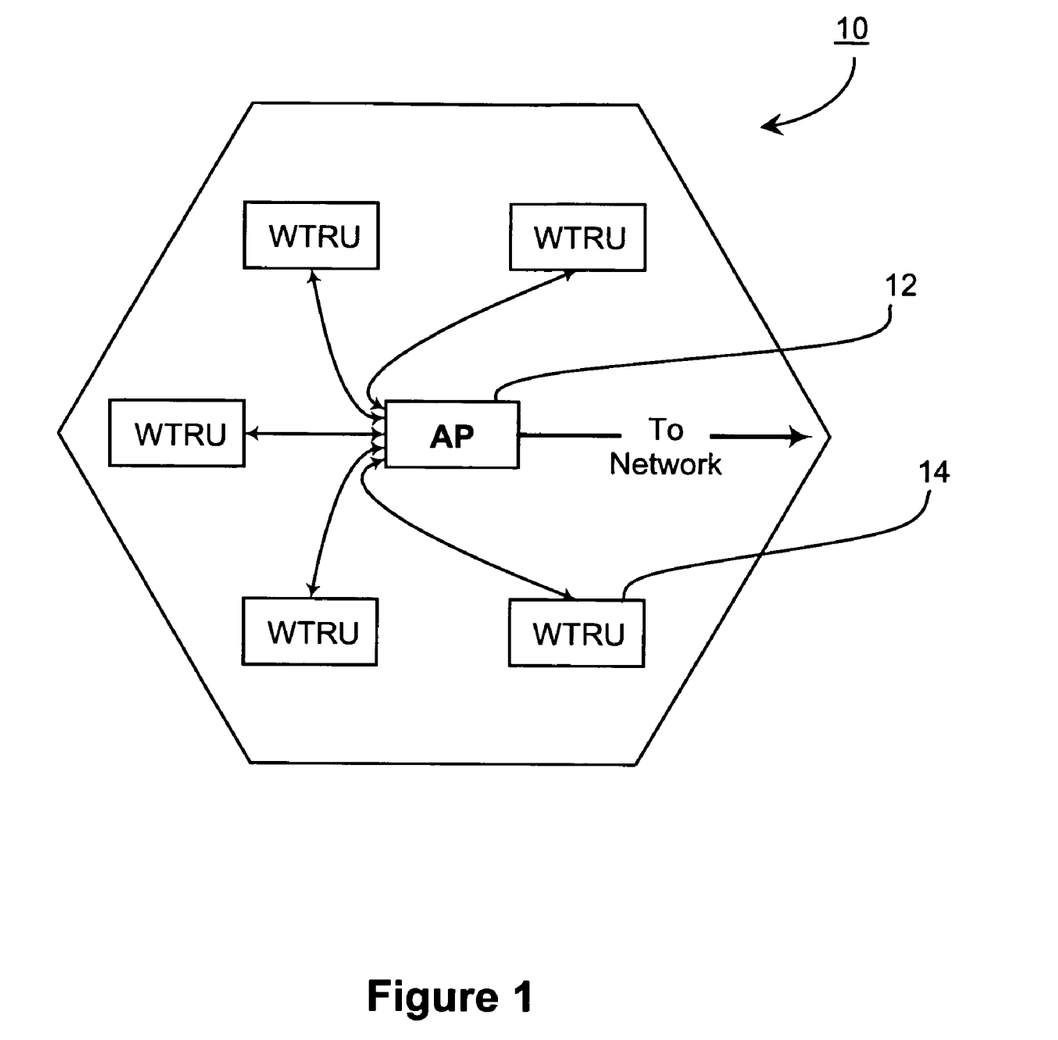
FIG. 1 is a system overview diagram illustrating conventional wireless communication in a wireless local area network (WLAN).

FIG. 1 illustrates a conventional wireless communication environment in which WTRUs conduct wireless communications via a network station, in this case an AP of a WLAN. The AP is connected with other network infrastructure of the WLAN such as an Access Controller (AC). The AP is shown as conducting communications with five WTRUs. The communications are coordinated and synchronized through the AP. Such a configuration is also called a basic service set (BSS) within WLAN contexts.

In the wireless cellular context, one current standard in widespread use is known as Global System for Mobile Telecommunications (GSM). This is considered as a so-called Second Generation mobile radio system standard (2G) and was followed by its revision (2.5G). General Packet Radio Service (GPRS) and Enhanced Data for GSM Evolution (EDGE) are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard. In addition to the 3GPP standards, 3GPP2 standards are being developed that use Mobile IP in a Core Network for mobility.

Much of the development of wireless communication systems has been motivated by the desire to reduce communication errors, improve range and throughput, and minimize costs. Most recent advances have been made possible by exploiting diversity in the time, frequency and code dimensions of communication signals. U.S. Pat. No. 5,614,914, which issued on Mar. 25, 1997 and is assigned to the assignee of the present invention, is an example of utilizing diversity to improve wireless communications.

Since the mid 1990s, the development of Multiple-Input Multiple-Output (MIMO) systems has led to increases in throughput without increasing transmission power or bandwidth, by exploiting the spatial diversity of the wireless communication channel. Much research effort on MIMO systems has been directed towards finding methods to improve throughput or signal to noise ratio (SNR) with given wireless channel conditions. Prior research has focused on using either space time coding (STC) or so-called water-filling applications over time, frequency, and space. The present invention utilizes a different approach, improving throughput and SNR by conditioning the channel. This approach can be used independently or in combination with other methods.

The improvement of spatial diversity presents a significant challenge. Increasing spatial diversity in MIMO systems may be exploited to achieve higher throughput for a given transmit power and bandwidth than Single-Input Single-Output (SISO), Single-Input Multiple-Output (SIMO) or Multiple- Input Single-Output (MISO) systems. A common technique for increasing spatial diversity is by physically relocating, moving, and/or adding antennas to the system. However this is not always possible. When it is not possible to add more antennas or adjust their positions, a typical MIMO system's ability to exploit available spatial diversity in the channel is limited to the channel condition defined by the physical configuration of the transmit and receive antennas. The inventors have recognized that is possible to improve communications in spite of such limitation and have devised the present invention for conditioning the channel.

SUMMARY

The present invention is characterized by method and apparatus for conditioning a MIMO communication channel by adjusting the sensitivity or individual antenna element "weight" of the antenna arrays at the transmitter and/or the receiver. In the transmitter and/or the receiver, the "weight" assigned to each antenna is determined by a "beamforming vector." The beamforming vector allows the combined multiple antennas in each of the transmitter and the receiver to have a directional or otherwise controllable character. In the transmitter, this allows the transmit power to be directed in a preferred direction, or to be better matched to the characteristics of the channel. In the receiver, this allows the receiver sensitivity to be enhanced in a preferred direction, or enhanced for desired signals, or to be better matched to the characteristics of the channel. A transmit or receive antenna array that is better matched to the channel is one that improves the Signal Interference Noise Ratio (SINR), the Packet Error Rate (PER), or some preferred characteristic of the desired transmitted or received signals, respectively.

A closed loop process is preferably used to determine and implement a choice transmit (TX) beamforming vector in the transmitter. The process can be based on a characteristic of the signal received at the receiver, such as the SINR or PER, or can be based on movement in the system. The choice TX beamforming vector can be one of a predefined set, or can be calculated in the receiver or in the transmitter using a determined channel matrix. A choice receiver (RX) beamforming vector can optionally also be implemented. The choice RX beamforming vector can be one of a predefined set, or can be calculated in the receiver or in the transmitter using the channel matrix.

Also, the determination of a choice vector based on a selection of a vector from a predefined set of vectors can be implemented as an initiation set for the selection of a further choice vector calculated using the channel matrix.

The determination of a choice vector can be repeated based on a selected event, such as a drop in SINR, PER or some preferred characteristic of the desired transmitted signals. As an alternative or in combination with repetition based on a preferred characteristic. The process can be repeated at a preferred rate to respond to changes in a dynamic channel, or at a rate which is adjusted according to the rate of change of the channel.

Implementing the choice TX and/or RX beamforming vectors of the present invention may be combined with other techniques to improve the power efficiency of transmission, such as water filling, Minimum Mean-Square Error (MMSE), Zero Forcing (ZF) or MAXMIN techniques. It may also be combined with Adaptive Modulation Coding (AMC), whereby the modulation constellation may be adapted to the channel conditions that have been obtained by the channel conditioning method described herein.

Preferably, a transmitting station is provided configured for use in wireless communication with a multiple-input multiple-output (MIMO) antenna system. A plurality M of transmit (TX) antennas each have an associated signal path. A processor is configured to process a signal for transmission by the plurality of M antennas by applying a selectively determined M-size TX beamforming vector and a unitary matrix across the TX antenna signal paths whereby different weights are applied to the signals directed to each TX antenna for transmission in correlation with the applied TX beamforming vector. A TX beamforming vector selection component associated with said processor is configured to select the TX beamforming vector applied by the processor.

The TX beamforming vector selection component is preferably associated with a receiving component in order to change the selection of a TX beamforming vector based on information received from a receiving station that is responsive to signals transmitted from said plurality M of transmit (TX) antennas.

The transmitting station may include a memory for storing a plurality of indexed TX beamforming vectors associated with the TX beamforming vector selection component. The TX beamforming vector selection component is then preferably configured to successively select each indexed TX beamforming vector of a stored predefined vector set for application by the processor in connection with the determination and selection of a choice TX beamforming vector.

Preferably, a receiving station is provided configured for use in wireless communication with a multiple-input multiple-output (MIMO) antenna system. A plurality N of receive (RX) antennas each have a signal path. The antennas are configured to receive signals from a multi-antenna transmitting station produced by applying a unitary matrix across transmit antenna signal paths. A processor is configured to process the signals received by the N antennas by applying a Hermitian of the unitary matrix and a selected N-size RX beamforming vector, whereby different weights are applied to the signal across the N signal paths in direct correlation with the applied RX beamforming vector. A beamforming vector selection component is associated with the processor and is configured to select the RX beamforming vector applied by the processor.

Preferably, the receiving station includes a memory for storing a plurality of indexed RX beamforming vectors associated with the RX beamforming vector selection component. The RX beamforming vector selection component is then configured to successively select each indexed RX beamforming vector of a stored predefined vector set for application by the processor in connection with the determination and selection of a choice RX beamforming vector.

The RX beamforming vector selection component may include a measuring device and a comparator. The measuring device is preferably configured to measure a preferred characteristic of the received signal; the comparator is preferably configured to compare measured values of the preferred characteristic and to select a received signal with a best characteristic whereby the RX beamforming vector that produced the selected signal is selected as the choice RX beamforming vector.

The receiving station may a component configured to measure a preferred characteristic of received signals and identify a TX beamforming vector that produced each respective measured signal as well as a comparator and a communication component. In such case the comparator is preferably configured to compare measured values of the preferred characteristic and to select a received signal with a best characteristic and the communication component is preferably configured to send information identifying TX beamforming vector that produced the selected signal having the best characteristic to the multi-antenna transmitting station that transmitted the signal.

The receiving station processor can be configured to calculate a channel matrix based on a received signal. The beamforming vector selection component can then be configured to calculate choice RX and TX beamforming vectors based on the channel matrix, select the choice RX beamforming vector for use by the processor and to send information identifying choice TX beamforming vector to the multi-antenna transmitting station that transmitted the received signal.

Both transmitting stations and receiving stations constructed to implement the invention can advantageously be to communicate Orthogonal Frequency Division Multiplex signals.

Other objects and advantages will be apparent to those of ordinary skill in the art based upon the following description of presently preferred embodiments of the invention.

TABLE OF ACRONYMS

| | |
|---|---|
| AMC | Adaptive Modulation Coding |
| AP | Access Point |
| ASIC | Application Specific Integrated Circuit |
| BS | Base Station |
| DFT | Discrete Fourier Transform |
| FFT | Fast Fourier Transform |
| IFFT | Inverse Fast Fourier Transform |
| IID | Independent Identically Distributed |
| MIMO | Multiple Input-Multiple Output |
| MISO | Multiple Input Single Output |
| MMSE | Minimum Mean-Square Error |
| OFDM | Orthogonal Frequency Division Multiplex |
| PER | Packet Error Rate |
| QAM | Quadrature Amplitude Modulation |
| RX | Receive, Receiver |
| SIMO | Single Input Multiple Output |
| SINR | Signal Interference Noise Ratio |
| SISO | Single Input Single Output |
| SNR | Signal to Noise Ratio |
| STA | Station |
| TX | Transmit, Transmitter |
| WLAN | Wireless Local Area Network |
| WMAN | Wireless Metropolitan Area Network |
| ZF | Zero Forcing |

DETAILED DESCRIPTION OF THE PREFERRED EMBODIMENTS

The communication channel is conditioned through the use and improvement of an orthogonal beam space. The orthogonal beam space is obtained by preconditioning the channel with a unitary matrix, and is modified by using beamforming vectors. The unitary matrix can be a Butler matrix, equivalent to a discrete Fourier transform (DFT). Under certain circumstances a Hadamard transform may replace the Butler matrix.

Referring to FIG. 1, a portion of a conventional communication system 10 is shown in which an access point (AP) 12 provides communication services to a plurality of wireless transmit/receive units (WTRUs) 14. The AP communicates with a broader network (not shown), thereby providing additional network services to the WTRUs, such as access to the Internet or a telephone network.

Figure 2:
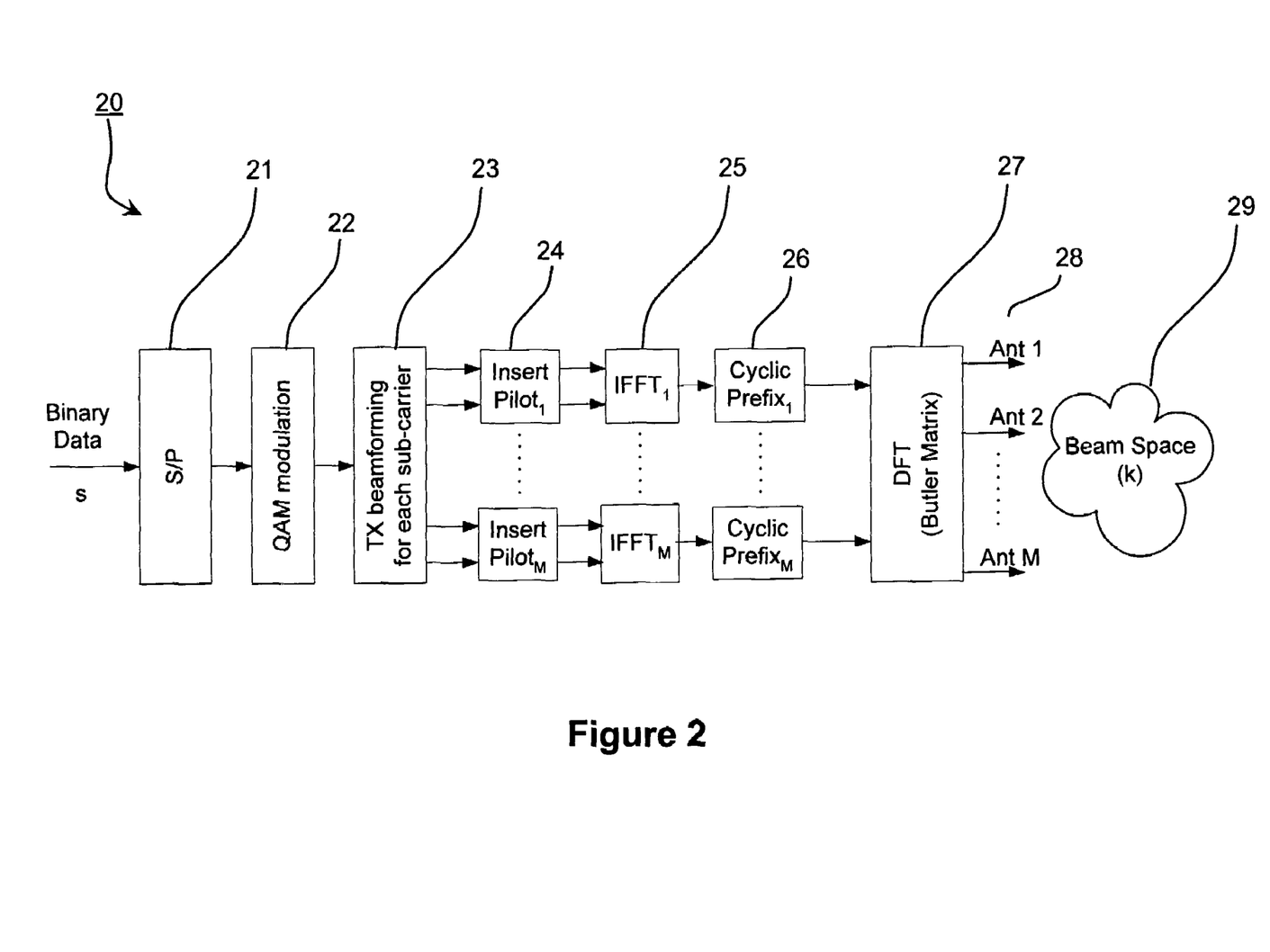
FIG. 2 is block diagram illustrating a CDMA transmitter which uses the present invention.

Referring to FIG. 2, a code division multiple access (CDMA) transmitter with multiple antennas 20 is shown, in which the present invention is used. A serial binary data stream s in the transmitter is divided into a plurality of parallel streams of data in a serial/parallel processor S/P at 21, each stream to be transmitted on a different subcarrier. Each of the parallel data streams is modulated at 22 using quadrature amplitude modulation (QAM), and each sub-carrier is modified at 23 according to a transmit beamforming vector. Next, a pilot signal is inserted at 24 into the data stream, and the combined data-pilot signal is processed at 25 using an inverse fast Fourier transform (IFFT). A cyclic prefix is added at 26. Finally the signal is processed at 27 using a using a unitary matrix, such as a Butler matrix, to produce a number M of orthogonal carriers equal to the number of transmit antennas. Each of the carriers is then transmitted via a separate antenna at 28. The transmitted signals in the physical environment comprise a beam space (k) 29.

Figure 3:
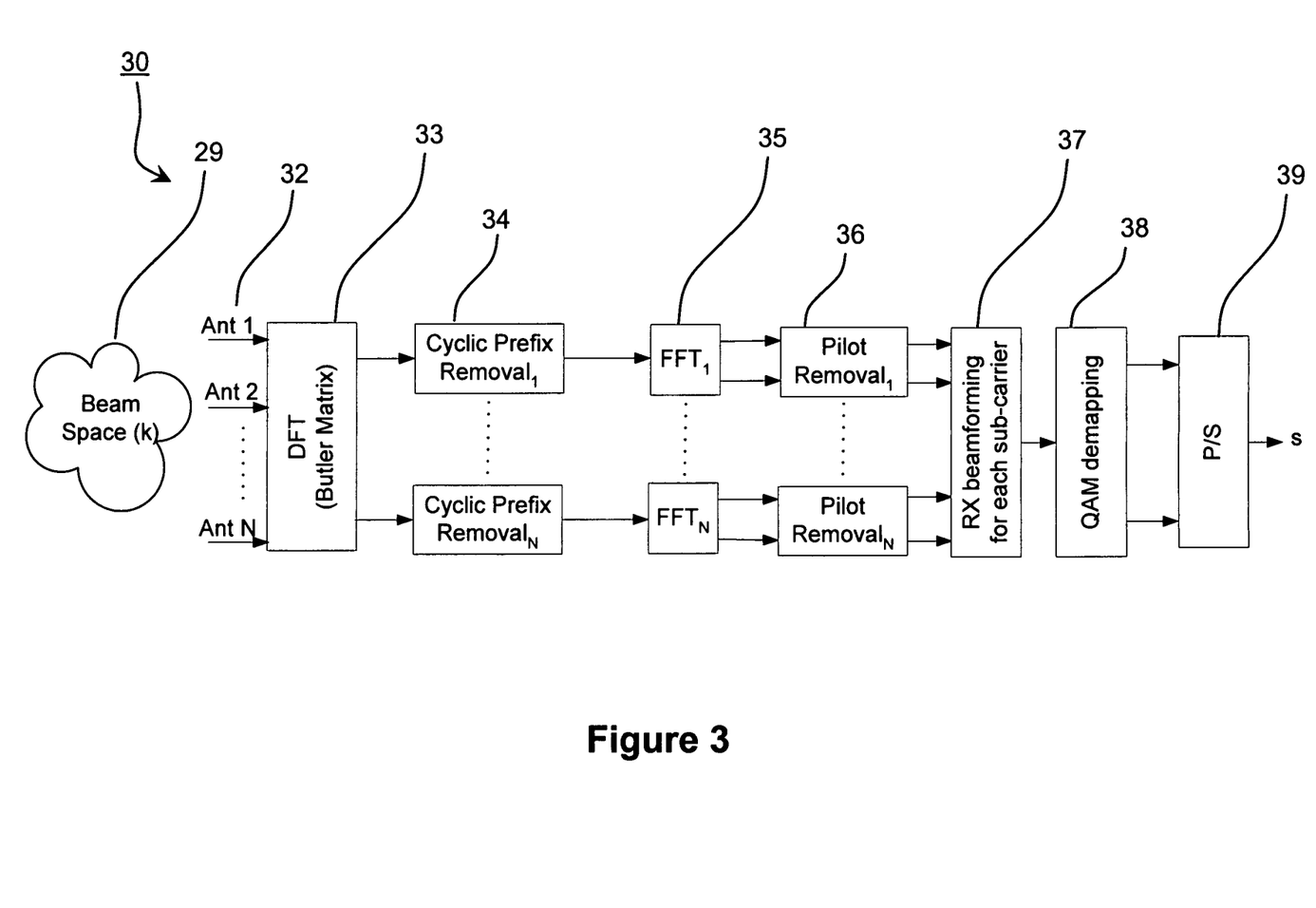
FIG. 3 is block diagram illustrating a CDMA receiver which uses the present invention.

Referring to FIG. 3, the inverse process is shown, performed at a CDMA receiver with multiple antennas 30, in which the present invention is used. Transmitted signals are received from the beam space (k) 29 via N separate receive antennas at 32. A unitary matrix such as the Hermitian of a Butler matrix is applied to the received signals at 33, and then the cyclic prefix is removed at 34. A fast Fourier transform is applied to the signals at 35, and the pilot signal is removed at 36. Each subcarrier is modified according to a receive beamforming vector at 37, and the QAM is demapped at 38 to recover the original parallel signals. Finally, the parallel signals are combined in a parallel to serial processor P/S at 39, whereby the original serial signal s is reconstructed.

Figure 4:
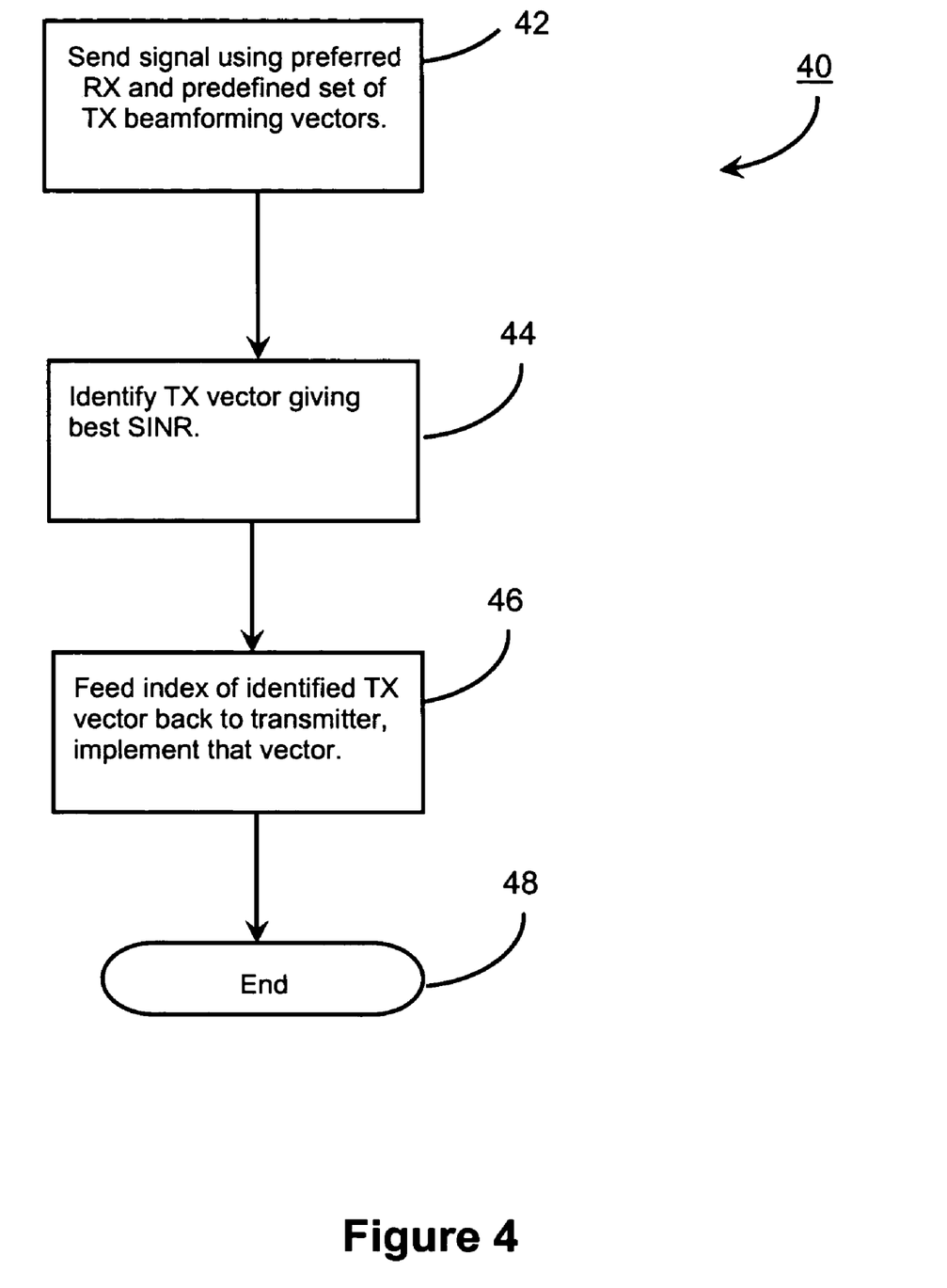
FIGS. 4-6 are flow diagrams of channel conditioning processes according to the present invention.

Referring to FIG. 4, a process 40 of improving a MIMO communication channel is illustrated, according to a first embodiment of the present invention where a choice vector is selected from a predefined set of vectors. A set of preferred beam patterns are designed for the system. Each beam pattern has a corresponding transmit (TX) beamforming vector that determines the weights applied to each of the transmitter antennas. The set of TX beamforming vectors corresponding to each beam are indexed and stored in a non-volatile memory in the transmitter. In step 42 the transmitter uses the set of indexed TX beamforming vectors to send a signal containing the beam index via each of a set of directional beams, which the receiver receives using a beam pattern which may be omnidirectional. The receiver measures the SINR of each received signal and identifies the beam index of the signal with the best SINR, step 44, as the manner to select a choice TX vector for implementation. The receiver feeds the beam index of the chosen vector back to the transmitter, step 46. The transmitter receives the index and reconfigures itself to use the selected choice TX beamforming vector, which is then used for communications.

The number of TX beamforming vectors in the set can be related to the number of TX antennas used. Alternatively, a preferred number, such as five or six, can be used to provide enhanced performance without undue complexity.

The first embodiment of choice vector determination can similarly be applied to the determination of a choice RX beamforming vector. For example, the transmitter can use a beam pattern, which may be omnidirectional, to transmit a signal, and the receiver can be configured with a set of RX beamforming vectors stored in a non-volatile memory. In a preferred implementation, the receiver uses each RX beamforming vector in the set to receive the signal, measures the SINR of the signal using each vector, and identifies and implements the vector giving the best SINR as a choice RX vector. The choice RX beamforming vector is then used for communications. The number of RX beamforming vectors in the set can be related to the number of RX antennas used. Alternatively, a preferred number, such as five or six, can be used to provide enhanced performance without undue complexity.

The first embodiment of choice vector determination can also be implemented as a combination of the selection of both a choice TX beamforming vector and a choice RX beamforming vector. For example, both the transmitter and the receiver can be configured with sets of beamforming vectors stored in respective memories. In a preferred implementation, the receiver uses a beam pattern which may be omnidirectional while the transmitter sweeps through its beam set, the receiver identifies the TX beam index resulting in the best SINR, and feeds it back to the transmitter which implements the associated TX beamforming vector. The transmitter then sends a signal while the receiver sweeps through its beam set, and identifies and implements the RX beamforming vector giving the best SINR. Alternatively, the receiver can sweep through its set of vectors before the transmitter sweeps through its set. The number of TX and RX beamforming vectors in each set can be related to the number of TX and RX antennas used, respectively. Alternatively, a preferred number of each which results in enhanced performance without undue complexity, such as five or six, can be used.

The determination of a choice vector in accordance with the first embodiment of the present invention can be implemented in a recursive manner for continued conditioning of the channel. In one example, referring to FIG. 5, a process 50 of improving and maintaining a MIMO communication channel is illustrated based on utilization of the first embodiment in a repetitive manner. For example, a preferred set of indexed TX beamforming vectors are stored in the transmitter and used to send a signal which the receiver receives using an omnidirectional or other beam pattern, step 52. The receiver measures the SINR of each received signal and identifies the beam index of the signal with the best SINR, and feeds it back to the transmitter, which implements the associated vector and uses it for communications, step 54. As an alternative to steps 52 and 54, a process such as described with respect to the selection of a choice RX beamforming vector or a combination of selection of both choice TX and RX beamforming vectors such as described above may be used.

Figure 5:
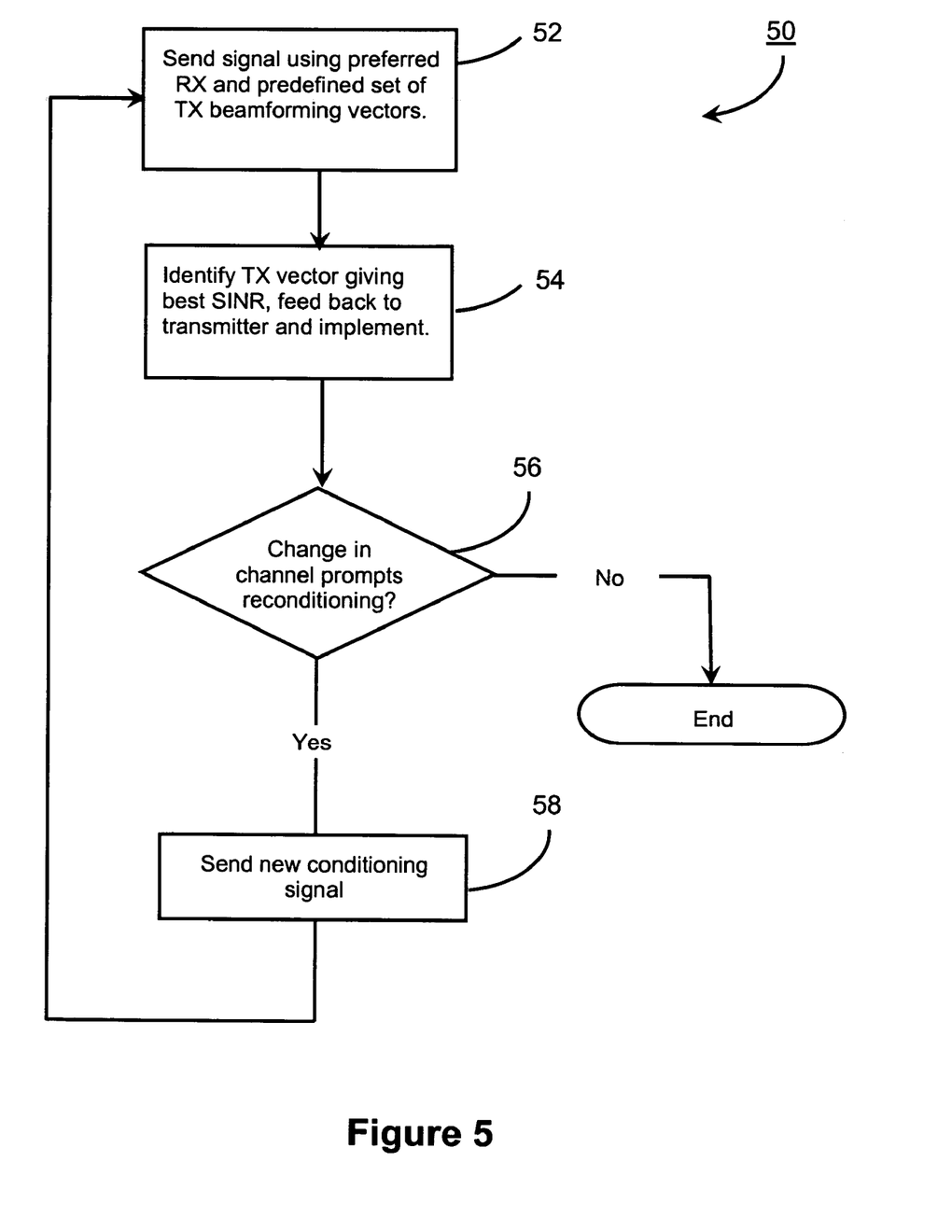

Thereafter, the receiver continues to monitor the SINR or other characteristic of the received communication signals. If the SINR or other preferred characteristic drops below a desired threshold, step 56, the receiver initiates a channel reconditioning process by prompting, step 58, the transmitter to send another conditioning signal and sweep through its beamforming vectors. The TX beamforming vector resulting in the best received SINR is selected as the choice vector and implemented, step 52. If the SINR or other characteristic of the received signal changes frequently, the process can be repeated based on changes in the SINR, at a preferred rate or a combination of such triggers. Where alternatives are initially used for steps 52 and 54, such as when a combination of selection of both choice TX and RX beamforming vectors is implemented for those steps, such alternative steps are preferably triggered for reconditioning.

According to a second embodiment of the present invention, a preferred TX beamforming vector which may be omnidirectional is used to send a signal, which is received by a receiver using a preferred RX beamforming vector which may be omnidirectional. The receiver calculates a channel matrix using techniques which are known in the prior art. Using the channel matrix, choice TX and/or RX beamforming vectors are determined as described in detail below. The receiver preferably implements the choice RX beamforming vector, and sends to the transmitter the choice TX beamforming vector, which the transmitter implements for further communications. This type of channel conditioning may also optionally be coupled with its own reconditioning process as explained in connection with FIG. 6.

Figure 6:
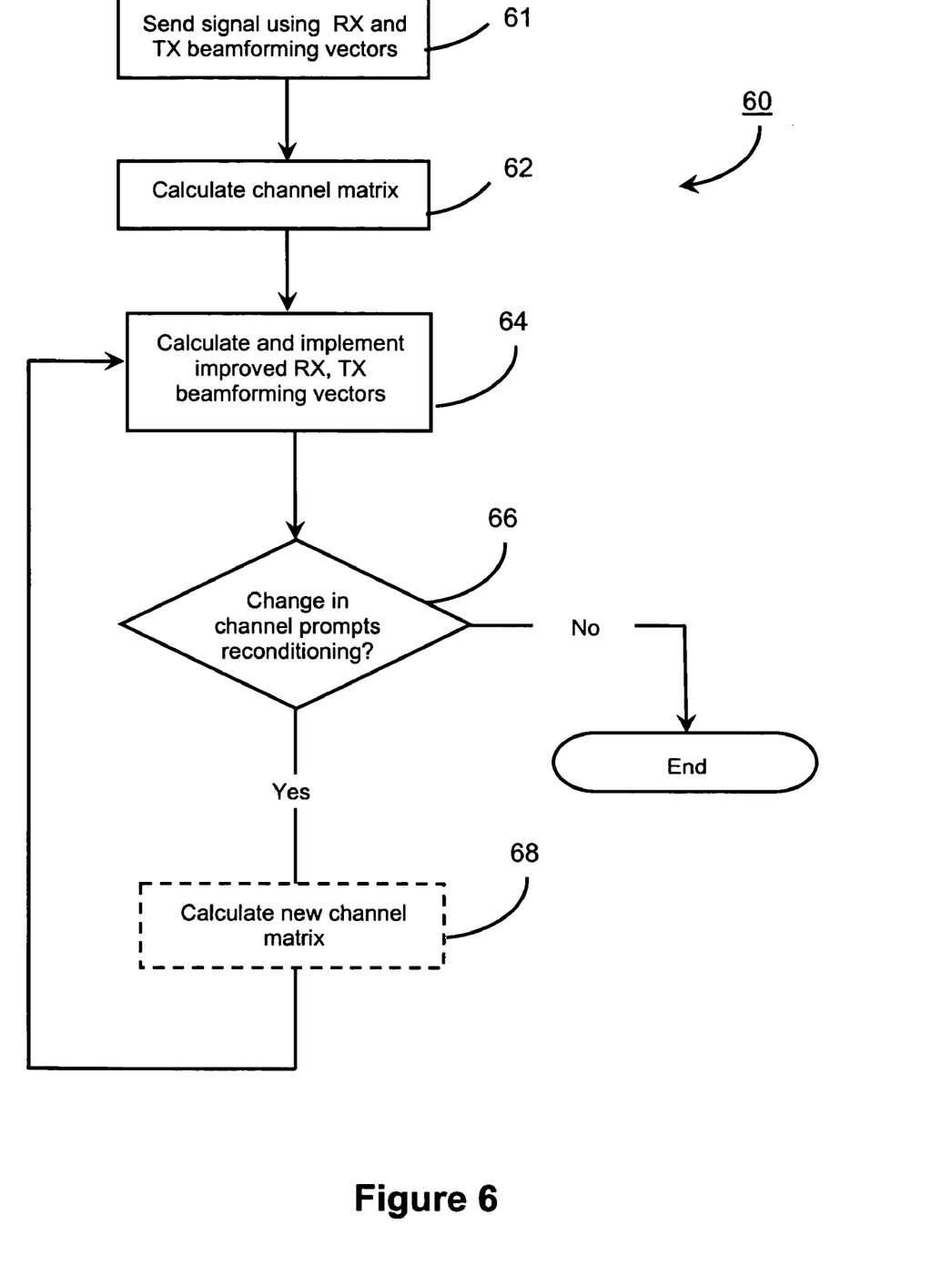

Referring to FIG. 6, a process 60 of improving and maintaining a MIMO communication channel is illustrated. A preferred TX beamforming vector is used to send a signal, step 61, which is received by a receiver using a preferred RX beamforming vector. The preferred TX beamforming vector used to send a signal in step 61 may be determined through implementation of the first embodiment as an initiation process or other desired manner.

The receiver calculates a channel matrix, step 62. The receiver then determines choice TX and RX beamforming vectors which vectors are implemented, respectively in the transmitter and receiver, step 64. Thereafter, the receiver continues to monitor the SINR or other characteristic of the received communication signals. If the SINR or other preferred characteristic drops below a desired threshold, step 66, the receiver reconditions the channel by recalculating RX and TX beamforming vectors to redefine the choice vectors, the receiver implements the redefined choice RX beamforming vector, and sends to the transmitter the redefined choice TX beamforming vector, which the transmitter implements. If the SINR or other characteristic of the received signal changes frequently, the process can be repeated based on changes in the SINR, at a preferred rate or a combination of such triggers.

Optionally, as indicated step 68 illustrated in phantom, a new channel matrix can be calculated before determining the new RX and TX beamforming vectors. Optional step 68 can be set up to be triggered when a lower threshold is exceeded in step 66 or if the reconditioning through the repetition of step 64 does not produce a significant improvement to the monitored characteristic.

A more complete description of the calculation of choice transmit and receive beamforming vectors according to the second embodiment of the present invention is as follows. Consider a MIMO-OFDM system in which the transmitter 20 with M transmit antennas in an array, transmits to the receiver 30 with N receive antennas in an array. Preferably, the distance between antennas for both the transmitter (TX) and receiver (RX) sides is very close, such as one or one half of a wavelength, and the antennas are preferably correlated. In general, a correlated MIMO system degrades the performance and the capacity.

To avoid performance and capacity degradation, a beam-space (fixed) beamforming matrix, such as butler matrix or DFT beamforming matrix 27, is implemented on the TX side and its Hermitian 33 is implemented as a beamforming matrix on the RX side. To control the directionality of the beam-space beamforming matrices, beamforming vectors controlling the sub-carrier weights are applied by processing circuitry 23 on the TX side and by processing circuitry 37 on the RX sides in an effort to improve received SINR.

Instead of generating only one beam direction using element space beamforming, by using beam space beamforming multiple independent beams or channels in beam space can be generated. This diagonalizes the channel matrix in the time domain, as well as the channel matrices for each carrier in the frequency domain, since the Butler matrix or DFT beamforming matrix are unitary matrices. Because of this, the invented system increases the capacity and the performance of the system, and the receiver structure is also made very simple.

Assume a K sub-carrier OFDM modulation. The signal sk(n), $1 \leq k \leq K$, denotes the information symbol transmitted at the kth sub-carrier during the nth OFDM symbol. The signals sk(n) are preferably modeled as zero-mean independent identically distributed (i.i.d.) random variables belonging to a fixed finite signal constellation set with normalized energy, namely, $E[|s_k(n)|^2]=1$, where E denotes the expectation operator.

At the transmitter, the modulated symbol for each sub-carrier is multiplied by an independent M×1 transmit beamforming vector, $b_k=[b_1^k\ b_2^k\ \ldots\ b_M^k]^T$. Next, an inverse fast Fourier transform (IFFT) is applied to those signals, and a cyclic prefix is added for each antenna. Next, a Butler matrix B or other fixed-beamforming matrix is applied in the time domain. The Butler matrix B is a discrete Fourier transform (DFT) matrix. Then, the signal is transmitted, and passes through a multipath fading channel in space.

At the receiver, the Hermitian of the Butler or other fixed-beamforming matrix, $B^H$, is applied. Then, the cyclic prefix is removed, and a fast Fourier transform (FFT) applied. Although in the real system the fixed beamforming matrices B and $B^H$ are applied in the time domain, the matrices are common to all sub-carriers, and thus applying the matrices in the time domain is equivalent to applying the matrices for each sub-carrier in the frequency domain. Therefore, in this formulation B and $B^H$ are treated as though they were applied in the frequency domain. Thus, the received signal in each sub-carrier can be represented (dropping the time index for simplicity) as $$y_k = B^H H_k B b_k s_k + B^H n_k, \quad 1 \leq k \leq K, \quad (1)$$

where the channel matrix Hk is an M×N matrix, and the channel for each sub-carrier is a flat fading channel. The vector nk denotes the noise vector of the kth sub-carrier in the frequency domain. Next, apply the RX beamforming vector to this signal. The result is $$r_k = \underline{a}_k^H \underline{y}_k \quad (2)$$
$$= \underline{a}_k^H B^H H_k B \underline{b}_k s_k + \underline{a}_k^H B^H \underline{n}_k.$$

Represent the covariance matrix of the system as $R_n^k$. Assume that the channel matrix Hk and the covariance matrix $R_n^k$ are available in both the transmitter side TX and the receiver side RX. The TX and RX beamforming vectors can then be jointly improved to define the choice vectors as follows.

The problem is to increase the average SINR for each sub-carrier, with fixed beamforming matrices at both the TX and RX sides, and can be stated mathematically as $$\Gamma_k = \frac{E[|\underline{a}_k^H B^H H_k B \underline{b}_k s_k|^2]}{E[|\underline{a}_k^H B^H \underline{n}_k|^2]} \quad (3)$$
$$= \frac{|\underline{a}_k^H B^H H_k B b_k|^2}{\underline{a}_k^H B^H R_n^k B \underline{a}_k}.$$

where $\Gamma_k$ is the SINR. The optimum RX beamforming vector is given by $$a_k = \mu_k (B^H R_n^k B)^{-1} B^H H_k B b_k, \quad (4)$$

where $\mu_k$ is an arbitrary real constant, and does not affect the value of SINR. $\mu_k$ is a kind of a normalization factor used to make $a_k^H B^H H_k B b_k = 1$. With the optimal ak thus calculated, the SINR $\Gamma_k$ can then be written as $$\Gamma_k = b_k^H B^H H_k^H (R_n^k)^{-1} H_k B b_k. \quad (5)$$

To find the optimum TX beamforming vector bk, define the matrix $\Psi_k$ as $$\Psi_k = H_k^H (R_n^k)^{-1} H_k. \quad (6)$$

Since $R_n^k$ is a Hermitian and is an invertible matrix, $\Psi_k$ can be decomposed as $$\Psi_k = U_k \Lambda_k U_k^H, \quad (7)$$

where $U_k$ is an unitary matrix whose columns are the eigenvectors of $\Psi_k$, and $\Lambda_k$ is a diagonal matrix that contains the corresponding eigenvalues, $\lambda_{k,m}$, $1 \leq m \leq M$. Then, $$\Gamma_k = (U_k^H B \underline{b}_k)^H \Lambda_k (U_k^H B \underline{b}_k) = \underline{b}_k'^H \Lambda_k \underline{b}_k' \quad (8)$$
$$= \sum_{m=1}^{M} \lambda_{k,m} |b'_{k,m}|^2,$$

where $$\underline{b}'_k = U_k^H B \underline{b}_k.$$

The TX power constraint for each sub-carrier is $|b_k|^2 = p_k$ and it becomes, with $b'_k$, $$|b'_k|^2 = (U_k^H B b_k)^H (U_k^H B b_k) = |b_k|^2 = p_k, \quad (9)$$

since Uk and B are unitary matrices. To maximize the SINR, the vector $b'_k$ can be shown to be given by $$\underline{b}'_k = \sqrt{p_k} \begin{bmatrix} 0 & \cdots & 0 & \underbrace{1}_{\text{the lth element}} & 0 & \cdots & 0 \end{bmatrix}^T \quad (10)$$

where $$l = \underset{m=1,\ldots,M}{\operatorname{argmax}} \{\lambda_{k,m}\}.$$

Then, the optimum TX beamforming vector bk is given by $$b_k = B^H U_k b'_k = \sqrt{p_k} B^H v_k, \quad (11)$$

where $v_k$ is the eigenvector of the matrix $\Psi_k$ that corresponds to the largest eigenvalue. The SINR then becomes $$\Gamma_k = (\sqrt{p_k} B^H \underline{v}_k)^H \Psi_k (\sqrt{p_k} B^H \underline{v}_k), \quad (12)$$
$$= p_k \lambda_{k,l}$$

since B is a unitary matrix. Here, $\lambda_{k,l}$ is the largest eigenvalue of the matrix $\Psi_k$. Therefore, this value is the maximum achievable SINR value with the power constraint $|b_k|^2 = p_k$.

After the channel matrix has been found and the choice transmit and receive beamforming vectors have been determined and implemented, it is possible to further improve the power efficiency of the transmitter by using known power optimization techniques. Such power optimization techniques can include waterfilling, minimum mean-square error (MMSE), zero forcing (ZF) or so-called MAXMIN techniques, which can also be applied to the other embodiments of the invention. An example follows.

First, using the known channel information, estimate the optimal transmit power within the limit of the total available transmit power, pk, for each sub-carrier. Using the $\Gamma_k$ and the largest eigenvalue for each sub-carrier, $\lambda_{k,l}$, the estimate can be defined as maximizing the equation $$\frac{K}{\sum_{k=1}^{K}\frac{1}{\Gamma_k}} = \frac{K}{\sum_{k=1}^{K}\frac{1}{\lambda_{k,l}p_k}} \quad (13)$$

subject to $$\sum_{k=1}^{K}|b_k|^2 = \sum_{k=1}^{K}p_k = P,$$

where P is the total transmit power and pk is transmit power for each sub-carrier k. The solution is $$p_k = \frac{P}{\sum_{k=1}^{K}\lambda_{k,l}^{-1/2}}\frac{1}{\sqrt{\lambda_{k,l}}}. \quad (14)$$

The process of decoding the data symbols will next be described. It is assumed that the system is operating in a frequency-selective Rayleigh fading environment and that the communication channel remains constant during a packet transmission. Suppose that the channel impulse response has L resolved paths and that the correlated channel matrix for the qth path is denoted by G(q). Then, the discrete-time MIMO baseband signal model after $B^H$ can be represented by $$\hat{z}(\tau) = \sum_{q=0}^{Q} B^H G(q) B \hat{x}(\tau - q) + B^H \underline{n}(\tau) \quad (15)$$

$$= \sum_{q=0}^{Q} B^H G(q) B \hat{x}(\tau - q) + \hat{\underline{v}}(\tau)$$

where $\hat{x}(\tau)$ represents a time domain OFDM symbol after applying each carrier's TX beamforming vector, and $n(\tau)$ represents additive white Gaussian noise at the $\tau$ sample, with N independently and identically distributed (i.i.d.) zero-mean complex Gaussian noise with the correlation matrix $\sigma_n^2 I_N$. Since the matrix B is a unitary matrix, the transformed noise $v(\tau)$ also has i.i.d. zero-mean complex Gaussian noise with the correlation matrix $\sigma_n^2 I_N$.

To deal with the frequency selective channel, OFDM is applied, utilizing Nc subcarriers per antenna transmission. To combat Inter-Symbol Interference (ISI), a Cyclic Prefix (CP) of Ng samples is added to the OFDM symbols. When $Q \leq N_g +$ 1, ISI does not occur on a MIMO OFDM symbol basis, and the ath received MIMO OFDM symbol after removal of CP is given as $$z(a) = Cx(a) + v(a) \quad (16)$$

where C is an effective channel matrix and is a K N×K M block circulant matrix with N×M block matrices. The block circulant matrix can be defined with the first block column and the first block column is defined as $$C_1 = \begin{bmatrix} B^H G(0) B \\ \vdots \\ B^H G(Q-1) B \\ 0_{N(K-Q) \times M} \end{bmatrix} \quad (17)$$

where $0_{N(K-Q) \times M}$ is the N(K−Q)×M all zeros matrix. Let x(i, a) denote the symbol vector transmitted on the kth subcarrier of the ath MIMO OFDM symbol. Then, the transmitted block of samples in the time-domain becomes $$\underline{x}'(a) = (F^{-1} \otimes I_M) \begin{bmatrix} x_0(a) \\ \vdots \\ \vdots \\ x_{K-1}(a) \end{bmatrix} = (F^{-1} \otimes I_M) \underline{x}(a) \quad (18)$$

where $\otimes$ denotes Kronecker product, F is the K×K Fourier matrix and In represents the n×n dimensional identity matrix. By taking FFT (fast Fourier transform) at the receiver, the frequency domain MIMO OFDM baseband signal model can be represented by $$\underline{y}(a) = (F \otimes I_N) \underline{x}'(a) \quad (19)$$
$$= (F \otimes I_N)(C(F^{-1} \otimes I_M) \underline{x}(a) + \underline{v}(a))$$
$$= \hat{H} \underline{x}(a) + \underline{n}^f(a)$$

where $n^f(a)$ represents the frequency domain noise with i.i.d zero-mean complex Gaussian with ($\frac{1}{2}$)$\sigma_n^2$ per dimension and $\hat{H}$ is a block diagonal matrix, given by $$\hat{H} = \begin{bmatrix} \hat{H}_0 & & 0 \\ & \ddots & \\ & & \ddots \\ 0 & & \hat{H}_{K-1} \end{bmatrix} \quad (20)$$

where each diagonal block is given as $$\hat{H}_k = \sum_{q=0}^{Q-1} B^H G(q) B \exp\left(-j2\pi \frac{ql}{K}\right) \quad (21)$$

from Eq. (1). For subcarrier k, the symbol can be written as $$y_k(a) = \hat{H}_k x_k(a) + n_k^f(a) \quad (22)$$

This is a flat fading signal model per subcarrier. After applying the RX beamforming vector, the signal becomes $$r_k = T_k s_k + n_k^r. \quad (23)$$

If we use all available beamforming vectors for all eigenvalues, $\lambda_{k,m}$, $1 \leq m \leq M$, in transmission and reception, namely use beamforming matrices for transmission and reception, the effective channel with TX and RX beamforming, Tk, becomes a diagonal matrix. Then, the data detection is easily done by the inverse matrix of this diagonal matrix. However, if the maximal SNR transmission and reception is used as described above, the effective channel, Tk, becomes just a scalar. Therefore, the data detection is simply done by a scalar equalizer. Therefore, the invention significantly reduces the complexity of the receiver structure.

Although the features and elements of the present invention are described in the preferred embodiments in particular combinations, each feature or element can be used alone without the other features and elements of the preferred embodiments or in various combinations with or without other features and elements of the present invention.

Preferably, the circuitry implementing the various transmitter and receiver processes and functions described above are incorporated in a single processor which may be an integrated circuit, such as an application specific integrated circuit (ASIC), with an interface component for interfacing with a source or consumer of serial data and another interface component for interfacing with multiple antennas. However, the circuitry may also be readily implemented using multiple separate integrated circuits and/or discrete components.

The foregoing description makes references to specific transmitter and receiver configurations as examples only and not as limitations. Other variations and modifications consistent with the invention will be recognized by those of skill in the art.

What is claimed is:

1. A method of wireless multiple-input multiple-output (MIMO) antenna communication for a wireless transmit receive unit (WTRU):
   receiving with a receiver having a plurality of N antennas a first set of signals from another WTRU and processing each signal by applying a different N-size RX beamforming vector of a predefined vector set across N signal paths to each signal;
   measuring a preferred characteristic of each processed received signal;
   selecting the processed received signal with a best characteristic from among the processed received signals;
   identifying the RX beamforming vector that was used to produce the processed received signal with the best characteristic as a choice RX beamforming vector and implementing in the receiver the choice RX beamforming vector; and
   processing a second set of signals for transmission by a transmitter having a plurality of M transmit (TX) antennas including:
      defining a signal path for each of the M TX antennas;
      applying a different M-size TX beamforming vector of a predefined vector set across the M signal paths to each signal of the second set of signals; and
      processing each signal of the second set of signals with a unitary matrix; and
   transmitting each processed signal of the second set of signals by the plurality of M antennas, whereby each transmitted signal of the second set of signals is selectively adjusted in direct correlation with the corresponding TX beamforming vector;
   the transmitting each processed signal including transmitting an index of the TX beamforming vector that was used to produce the signal;
   receiving an indication of which transmitted signal of the second set of signals had a best receive characteristic whereby the TX beamforming vector that was used to produce that transmitted signal is identified as a choice TX beamforming vector:
   the receiving an indication including receiving the index of the TX beamforming vector that was identified as the choice TX beamforming vector to enable implementation of the choice TX beamforming vector in the transmitter; and
   implementing in the transmitter the choice TX beamforming vector for further signal transmissions.

2. The method of claim 1 wherein the unitary matrix is a Butler matrix and the RX antennas and the TX antennas are the same antennas.

3. The method of claim 1 wherein the receiving a first set of signals from the other WTRU is performed with respect to a set of signals for which the same beamforming vector was applied in the other WTRU.

4. The method of claim 3 further comprising:
   monitoring selected characteristics of signals received from the other WTRU after implementation of the choice RX beamforming vector in the receiver;
   reconditioning the channel in response to selectively defined changes in the monitored characteristics by repeating the receiving, processing, measuring, selecting and identifying steps with respect to the predefined set of RX beamforming vectors to re-determine the choice RX beamforming vector; and
   implementing the re-determined choice RX beamforming vector in the receiver.

5. A wireless transmit receive unit (WTRU) for use in wireless multiple-input multiple-output (MIMO) antenna communication comprising:
   a plurality N of receive (RX) antennas, each having a signal path, configured to receive signals from another WTRU produced by applying a unitary matrix across transmit antenna signal paths;
   a processor configured to process the signals received by the N antennas by applying a Hermitian of the unitary matrix and a selected N-size RX beamforming vector, whereby different weights are applied to the signal across the N signal paths in direct correlation with the applied RX beamforming vector;
   a beamforming vector selection component associated with said processor configured to select the RX beamforming vector applied by the processor; and
   a memory configured to store a plurality of indexed RX beamforming vectors associated with the RX beamforming vector selection component wherein the RX beamforming vector selection component is configured to successively select each indexed RX beamforming vector of a stored predefined vector set for application by the processor in connection with the determination and selection of a choice RX beamforming vector.

6. The WTRU of claim 5 further comprising:
   a plurality M of transmit (TX) antennas, each having an associated signal path;
   a processor configured to process a signal for transmission by the plurality of M antennas by applying a selectively determined M-size TX beamforming vector and a unitary matrix across the TX antenna signal paths whereby different weights are applied to the signals directed to each TX antenna for transmission in correlation with the applied TX beamforming vector;
   a TX beamforming vector selection component associated with said processor configured to select the TX beamforming vector applied by the processor; and a memory configured to store a plurality of indexed TX beamforming vectors associated with the TX beamforming vector selection component wherein the TX beamforming vector selection component is configured to successively select each indexed TX beamforming vector of a stored predefined vector set for application by the processor in connection with the determination and selection of a choice TX beamforming vector.

7. The WTRU of claim 6 wherein the TX beamforming vector selection component is associated with a receiving component and is configured to change the selection of a TX beamforming vector based on information received from a receiving station that is responsive to signals transmitted from said plurality M of transmit (TX) antennas.

8. The WTRU of claim 6 configured to transmit Orthogonal Frequency Division Multiplex signals wherein the RX antennas and the TX antennas are the same antennas.

9. The WTRU of claim 5 wherein the RX beamforming vector selection component includes:
   a measuring device for measuring a preferred characteristic of the received signal; and
   a comparator configured to compare measured values of the preferred characteristic to select a received signal with a best characteristic whereby the RX beamforming vector that produced the selected signal is selected as the choice RX beamforming vector.

10. The WTRU of claim 5 further comprising:
    a component configured to measure a preferred characteristic of received signals and identify a TX beamforming vector that produced each respective measured signal;
    a comparator configured to compare measured values of the preferred characteristic and to select a received signal with a best characteristic; and
    a communication component configured to send information identifying TX beamforming vector that produced the selected signal having the best characteristic to the other WTRU.

11. The WTRU of claim 10 wherein the processor is configured to calculate a channel matrix based on a received signal and the beamforming vector selection component is configured to calculate choice RX and TX beamforming vectors based on the channel matrix, select the choice RX beamforming vector for use by the processor and to send information identifying the choice TX beamforming vector to the multi-antenna transmitting station that transmitted the received signal.

12. The WTRU of claim 5 configured to receive Orthogonal Frequency Division Multiplex signals.

13. A receiving station for use in wireless multiple-input multiple-output (MIMO) antenna communication comprising:
    a plurality N of receive (RX) antennas, each having a signal path, configured to receive signals from a multi-antenna transmitting station produced by applying a TX beamforming vector and a unitary matrix across transmit antenna signal paths;
    a processor configured to process the signals received by the N antennas by applying a Hermitian of the unitary matrix;
    a component configured to measure a preferred characteristic of a set of received signals transmitted with different TX beamforming vectors and to identify the TX beamforming vector that produced each respective measured signal;
    a comparator configured to compare measured values of the preferred characteristic and to select a received signal with a best characteristic; and
    a communication component configured to send information identifying the TX beamforming vector that produced the selected signal having the best characteristic to the multi-antenna transmitting station that transmitted the set of signals.

14. The receiving station of claim 13 configured to receive Orthogonal Frequency Division Multiplex signals.

15. A method of wireless multiple-input multiple-output (MIMO) antenna communication for a receiving station comprising:
    receiving by a receiver having a plurality of N receive (RX) antennas a set of signals, where each signal was transmitted by applying a different TX beamforming vector and a unitary matrix across transmit antenna signal paths, including:
       defining a signal path for each of the N RX antennas;
       processing each received signal of the set of signals with the Hermitian of the unitary matrix; and
       applying an N-size RX beamforming vector; and
    measuring a preferred characteristic of a set of received signals transmitted with different TX beamforming vectors and identifying the TX beamforming vector that produced each respective measured signal;
    comparing measured values of the preferred characteristic and to select a received signal with a best characteristic; and
    sending information identifying the TX beamforming vector that produced the selected signal having the best characteristic to the multi-antenna transmitting station that transmitted the set of signals.

* * * * *

UNITED STATES PATENT AND TRADEMARK OFFICE
CERTIFICATE OF CORRECTION

PATENT NO. : 7,583,982 B2  Page 1 of 1
APPLICATION NO. : 11/167736
DATED : September 1, 2009
INVENTOR(S) : Olesen et al.

It is certified that error appears in the above-identified patent and that said Letters Patent is hereby corrected as shown below:

IN THE SPECIFICATION

At column 3, line 9, after the word "that" insert --it--.

At column 4, line 60, after the word "may", insert --include--.

At column 12, line 41, after the word "Gaussian" insert --noise--.

IN THE CLAIMS

At claim 1, column 13, line 48, after the word "vector;" delete "and".

At claim 1, column 13, line 55, after the word "signals;" delete "and".

At claim 1, column 13, line 57, after the word "matrix;" delete "and".

At claim 1, column 13, line 67, after the word "signals" insert --that--.

At claim 15, column 16, line 37, after the word "matrix;" delete "and".

At claim 15, column 16, line 38, after the word "vector;" delete "and".

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,583,982 B2
APPLICATION NO. : 11/167736
DATED : September 1, 2009
INVENTOR(S) : Olesen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Fourteenth Day of September, 2010

David J. Kappos
*Director of the United States Patent and Trademark Office*